(12) United States Patent
Winkler (10) Patent No.: US 6,817,824 B2
(45) Date of Patent: *Nov. 16, 2004

(54) PICKING APPARATUS

(75) Inventor: Walter Winkler, Parkstein (DE)

(73) Assignee: Witron Logistik & Informatik GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/810,374

(22) Filed: Mar. 15, 2001

(65) Prior Publication Data
US 2002/0021956 A1 Feb. 21, 2002

(30) Foreign Application Priority Data

Mar. 17, 2000 (DE) .......................... 100 13 214

(51) Int. Cl.⁷ ............................................. B65G 1/137
(52) U.S. Cl. ........................................ 414/273; 414/281
(58) Field of Search .................... 414/630–34, 666, 414/667, 668, 286, 280, 610, 277, 281, 287, 273; 187/9 R (56) References Cited

U.S. PATENT DOCUMENTS

| 3,606,039 A |   | 9/1971 | Weston et al. |
| 3,948,356 A | * | 4/1976 | Keene .......................... 187/237 |
| 4,252,217 A | * | 2/1981 | Benjamin ................... 187/234 |
| 4,252,497 A | * | 2/1981 | Burt ............................ 414/274 |
| 4,331,418 A | * | 5/1982 | Klebe ......................... 414/277 |
| 4,395,189 A | * | 7/1983 | Munten ....................... 187/234 |

(List continued on next page.)

FOREIGN PATENT DOCUMENTS

| DE | 2 413 089 | 3/1974 |
| DE | 9404044 | 6/1994 |
| DE | 44 37 568 C1 | 10/1994 |
| DE | 298-13-898 u1 | 7/1998 |
| EP | 0 442 000 B1 | 11/1994 |
| EP | 0773187 A2 | 5/1997 | ............. B66F/9/07 |
| GB | 1049811 | 11/1966 | |
| GB | 1103603 | 2/1968 | ............. B66F/9/12 |
| WO | PCT/US98/18151 | 3/1999 | |

OTHER PUBLICATIONS

English translation of the German Office Action corresponding to DE 100 13 213.6–22 dated Jul. 21, 2003 citing all the references listed herein.
DE–Z: Fördermitteljournal 1–2/1995, S. 32.
GB–Z: Materials Handling News, Juli 1977, S. 26.
DE–Z: Hebezeuge und Fördermittel, Berlin 36 (1996) 7/8 S. 317–319.
DE–Z: Industrieanzeiger 17/1996 vom 22.04. 1996, S. 52.
DE–Z: Maschinenmarkt, Würzburg 82 (1976) 93 vom Nov. 19, 1976, S. 1800.

Primary Examiner—Eileen D. Lillis
Assistant Examiner—Charles A. Fox
(74) Attorney, Agent, or Firm—Gray Cary Ware & Freidenrich LLP (57) ABSTRACT

The invention relates to an apparatus for picking articles situated on retrieval pallets (38) in a pallet rack (52), characterized by a vehicle (10) capable of travelling along the picking front of the pallet rack (52) and having a first lifting device (14) with a height-adjustable picker-carrying device (26) for the picker (18) and having a second lifting device (16) with a height-adjustable pallet-carrying device (28) for an order pallet (20), wherein the picker-carrying device and the pallet-carrying device are positionable heightwise relative to the respective retrieval position independently of one another. The picker situated on the picker-carrying device may therefore be transported along the picking front by means of the vehicle. The two independently operating lifting devices of the vehicles make it possible to achieve the, in each case, ergonomically most advantageous retrieval height and delivery height for the picker-carrying device and the pallet-carrying device respectively.

17 Claims, 11 Drawing Sheets

U.S. PATENT DOCUMENTS

| | | | | |
|---|---|---|---|---|
| 4,439,102 A | * | 3/1984 | Allen | 414/631 |
| 4,787,803 A | | 11/1988 | Van Elten et al. | 414/281 |
| 5,002,449 A | * | 3/1991 | Kita et al. | 414/273 |
| 5,044,472 A | * | 9/1991 | Dammeyer et al. | 180/273 |
| 5,098,254 A | * | 3/1992 | Becicka et al. | 414/792.9 |
| 5,199,531 A | * | 4/1993 | Malin | 187/224 |
| 5,450,929 A | * | 9/1995 | Ohgita et al. | 187/244 |
| 5,838,572 A | | 11/1998 | Hofstetter et al. | 364/478.01 |
| 5,953,234 A | * | 9/1999 | Singer et al. | 414/789.6 |
| 6,602,037 B2 | * | 8/2003 | Winkler | 414/273 |

* cited by examiner

PICKING APPARATUS

The invention relates to an apparatus for picking articles situated on retrieval pallets in a pallet rack.

The object of the invention is to provide such an apparatus that the picking process is facilitated for the picker and may be made altogether more ergonomic and effective.

Said object is achieved according to the invention by a vehicle capable of travelling along the picking front of the pallet rack and having a first lifting device with a height-adjustable picker-carrying device for the picker and having a second lifting device with a height-adjustable pallet-carrying device for an order pallet, wherein the picker-carrying device and the pallet-carrying device are positionable heightwise relative to the respective retrieval position independently of one another.

The picker situated on the picker-carrying device may therefore be transported along the picking front by means of the vehicle. The two independently operating lifting devices of the vehicle make it possible to achieve the, in each case, ergonomically most advantageous retrieval height and delivery height for the picker-carrying device and the pallet-carrying device respectively. By said means, stressing of the picker as a result of sub-optimum retrieval and delivery heights may be avoided. Automatic travel to the retrieval positions eliminates walking distances for the picker during picking, which leads to a considerable reduction of the journey times and makes the picking process more effective. The preferably provided computer control of the apparatus also eliminates the time taken by the picker in conventional systems to find the next retrieval position (orientation to the next bay).

In an advantageous development of the invention, the picker-carrying device comprises a cabin for the picker. Said cabin is preferably provided with a circumferential crash guard for the picker. A dead man's switch is advantageously provided as an additional safety device, which may be used simultaneously to acknowledge the pick.

In a preferred development of the invention, the pallet-carrying device comprises a load-receiving means for receiving and delivering an order pallet. The load-receiving means is advantageously designed in such a way as to enable transporting of the order pallet at right angles to the travelling direction of the vehicle.

In a particularly preferred development of the invention, the pallet-carrying device comprises a sensor device for determining the degree of charging of the order pallet, thereby enabling the height of the pallet-carrying device to be adapted to the degree of charging of the order pallet.

The picking apparatus according to the invention is conveyed on rails along the picking front in a similar manner to a storage and retrieval unit and is controlled by a control computer. The vehicle is moved in longitudinal direction in accordance with the pick controller to the respective retrieval position in front of the respective active retrieval pallet and, preferably at the same time, both the picker and the order pallet are moved into an optimum vertical position. The picker may then retrieve the quantity displayed at the terminal from the retrieval pallet and transfer it to the order pallet. The picking apparatus according to the invention is then steered to the next relevant retrieval position or to a transfer location or buffer location.

In a preferred development of the invention, it is provided that the height of the picker-carrying device at the respective retrieval position is controllable on the basis of the residual stock quantity of the articles on the retrieval pallet. It is further provided that the height of the pallet-carrying device at the respective retrieval position is controllable on the basis of the degree of charging of the order pallet. In said manner it is possible to achieve an ergonomically optimum retrieval and delivery height of picker-carrying device and pallet-carrying device at any time during picking, thereby reducing the physical strain on the picker to a minimum; in particular, no strain is placed on the spinal column of the picker during the picking process.

In addition, it is advantageously provided that the height of the picker-carrying device and/or of the pallet-carrying device at the respective retrieval position is adjustable individually for each picker, i.e. in the controller the optimum access height may be geared individually to each worker. Furthermore, it is advantageously provided that the heights preset by the controller are manually correctable by the picker. In contrast, control of the travel in aisle direction is preferably effected fully automatically without the possibility of intervention by the picker.

Further advantageous features of the invention arise from the remaining sub-claims and from the following detailed description of a preferred embodiment of the invention with reference to the drawings. Said drawings show in a diagrammatic and semi-diagrammatic manner:

Figure 1:
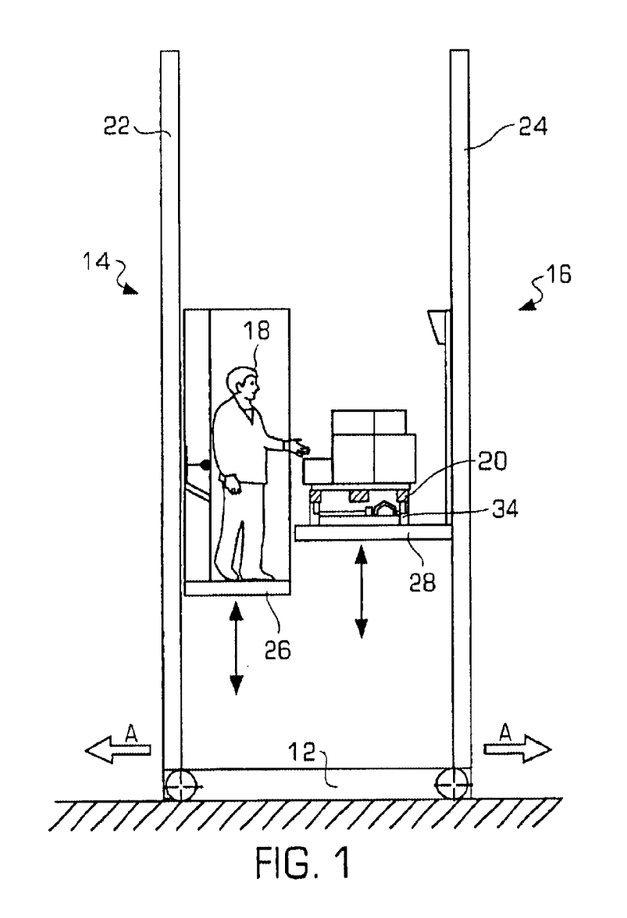
FIG. 1 a side view of an apparatus according to the invention.
Figure 2:
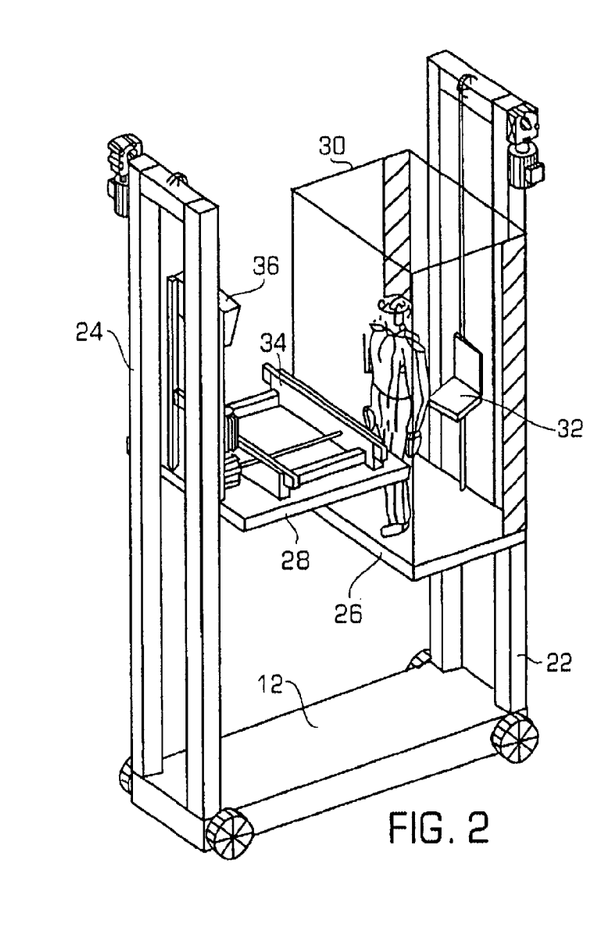
FIG. 2 a perspective view of the apparatus according to FIG. 1.

Reference is first made to FIGS. 1 and 2.

The apparatus according to the invention, hereinafter also referred to as "ergonomic picking mobile" or "EPM" for short, is denoted as a whole in the drawings by the reference character 10. It is a rail-mounted vehicle comprising a chassis 12 with travelling gear, wherein the travelling direction of the EPM is indicated in FIG. 1 by the arrows A and extends parallel to the picking front of the pallet racks, which are not shown in FIGS. 1 and 2. The EPM comprises a first lifting device 14 for the picker 18 and a second lifting device 16 for an order pallet 20. Each lifting device 14, 16 comprises a frame 22 or 24, which is fastened to the—viewed in travelling direction of the EPM—front or rear end of the chassis 12 so as to extend vertically upwards and along which in each case a platform 26 or 28 is guided in a height-adjustable manner. The two platforms 26, 28 in plan view are adjacent, leaving between them only a comparatively narrow gap, and they are adjustable in height independently of one another by means of the respectively associated lifting devices 14, 16 in such a way that the platform 28, for example, may be higher than, level with, or lower than the platform 26.

The platform 26, which is used to accommodate the picker 18, is equipped with a cabin having a circumferential crash guard 30, a driver's seat and an integrated dead man's switch 32. The driver's seat is designed as a standing seat for an ergonomic position during travel. Further safety equipment which is not shown in detail is likewise provided, such as e.g. means of preventing the vehicle from being set in motion when the picker is still busy outside of the vehicle (e.g. transferring the pallet) after the pick has been acknowledged, or means of preventing crushing as a result of movement of the order pallet relative to the platform. The dead man's switch 32 is used simultaneously to acknowledge the pick.

A load-receiving means 34 for the order pallet 20 is disposed on the platform 28, wherein the load-receiving means 34 enables a movement of the order pallet 20 at right angles to the travelling direction A of the EPM. The platform 28 moreover carries a terminal 36 for displaying the picking positions.

The EMP is controlled by a computer system, which on the one hand positions the vehicle and on the other hand places both the picker and the order pallets in the ergonomically most advantageous position at the respective retrieval position of the retrieval pallet situated in the pallet rack. Examples of this are illustrated in FIGS. 5a to 12b.

Setting of the picking platform to an ergonomic height is effected on the basis of the residual stock quantity on the retrieval pallet 38 (computer management). Setting of the height of the platform 28 carrying the order pallet 20 is effected on the basis of the degree of charging of the order pallet, which is evaluated by sensor equipment disposed on the platform 28. The optimum access height may in said case be geared in the controller also individually to the respective picker. The picker moreover also has the possibility of manually correcting the heights preset by the controller. Control of the travel in aisle direction, on the other hand, is effected fully automatically without the possibility of intervention by the picker.

Figure 3:
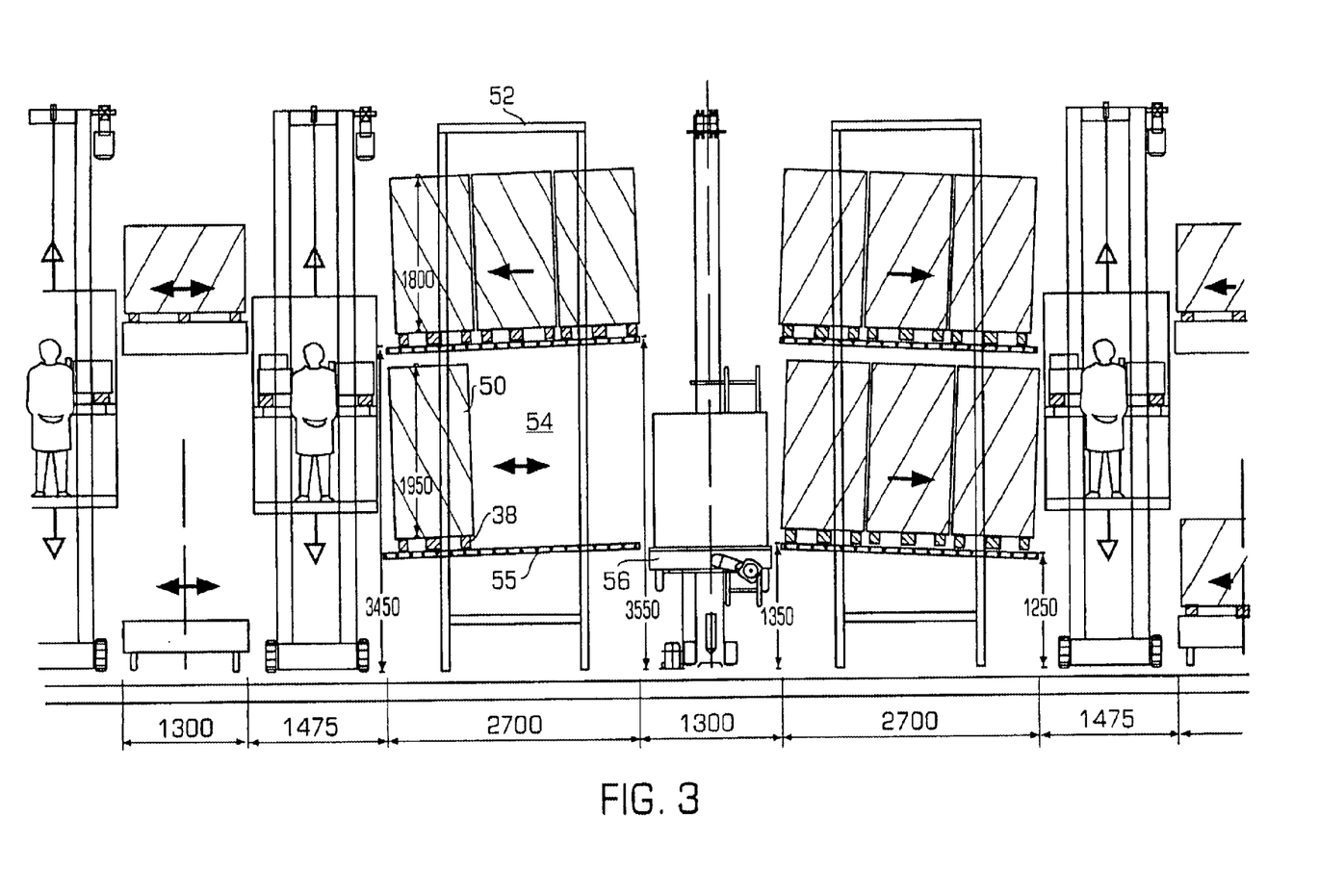
FIG. 3 a side view of part of a picking installation, in which a plurality of apparatuses according to the invention are used, FIG. 4 a plan view of the installation according to FIG. 3, and FIGS. 5a, 5b, 6a, 6b, 7a, 7b, 8a, 8b, 9a, 9b, 10a, 10b, 11a, 11b and 12a, 12b front views and side views of the apparatus according to the invention, which illustrate examples of the different levels for the picker-carrying device and the pallet-carrying device.
Figure 4:
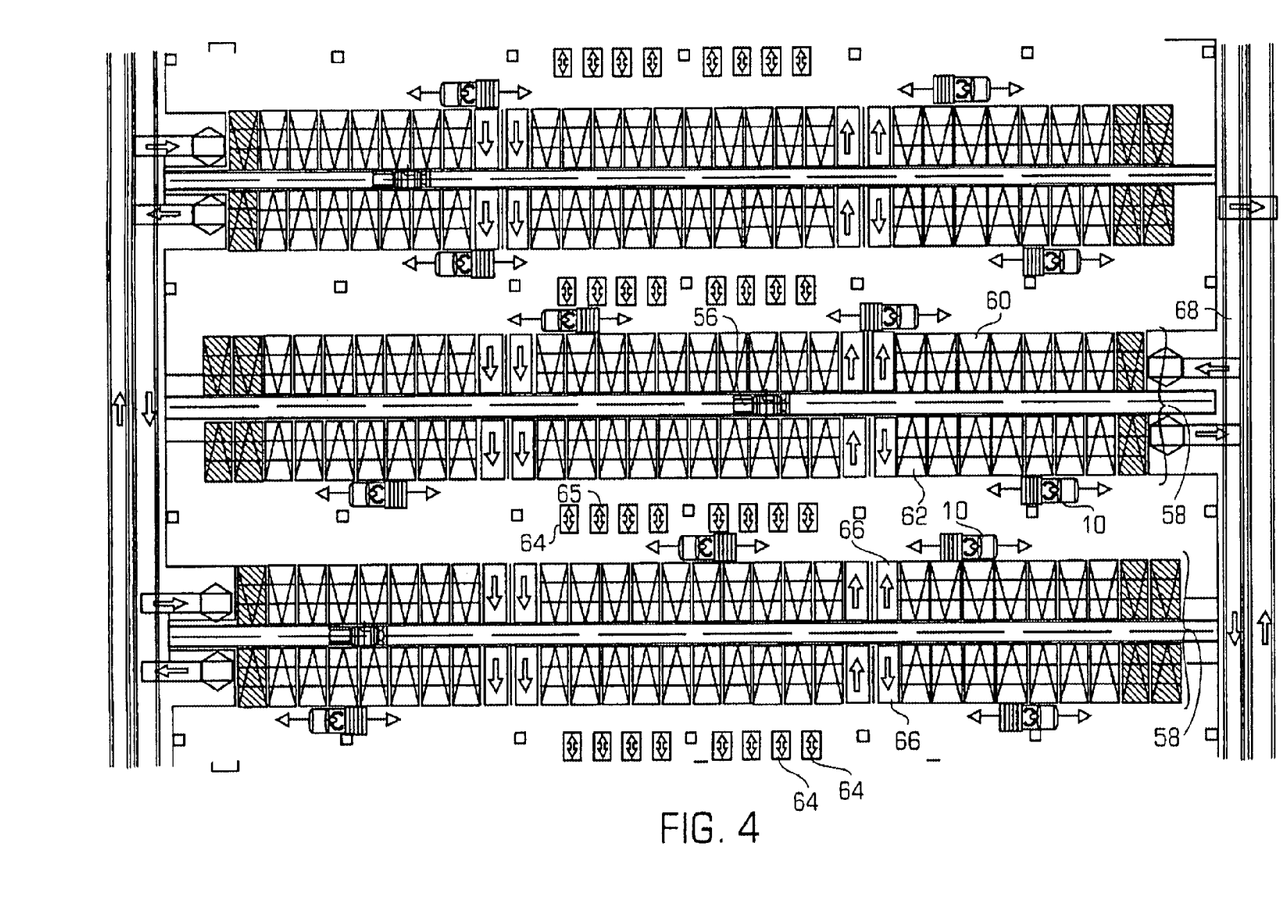
Figure 5A:
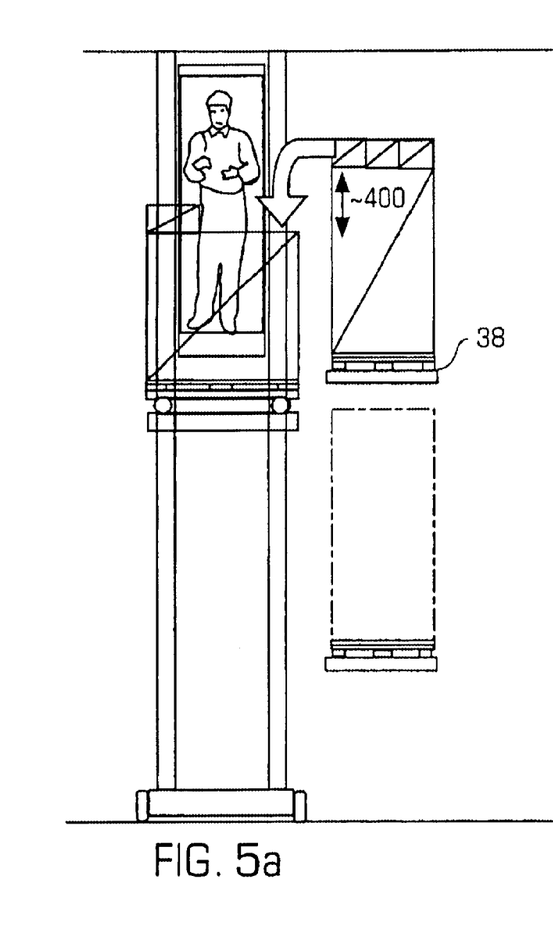
Figure 5B:
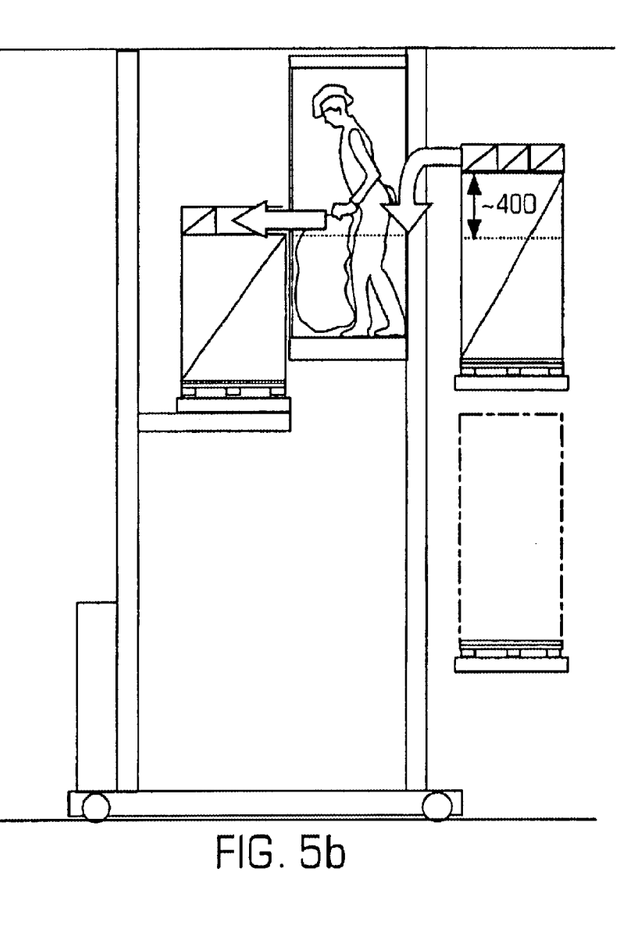
Figure 6A:
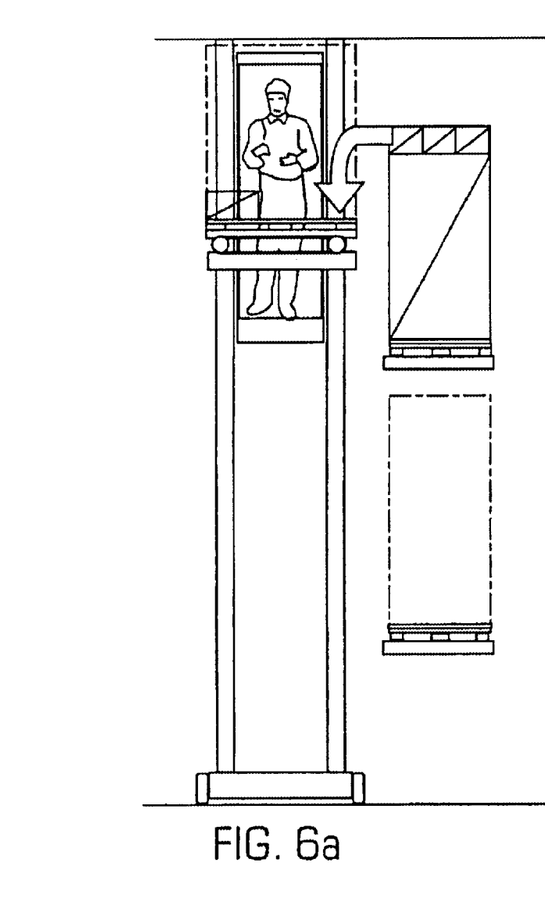
Figure 6B:
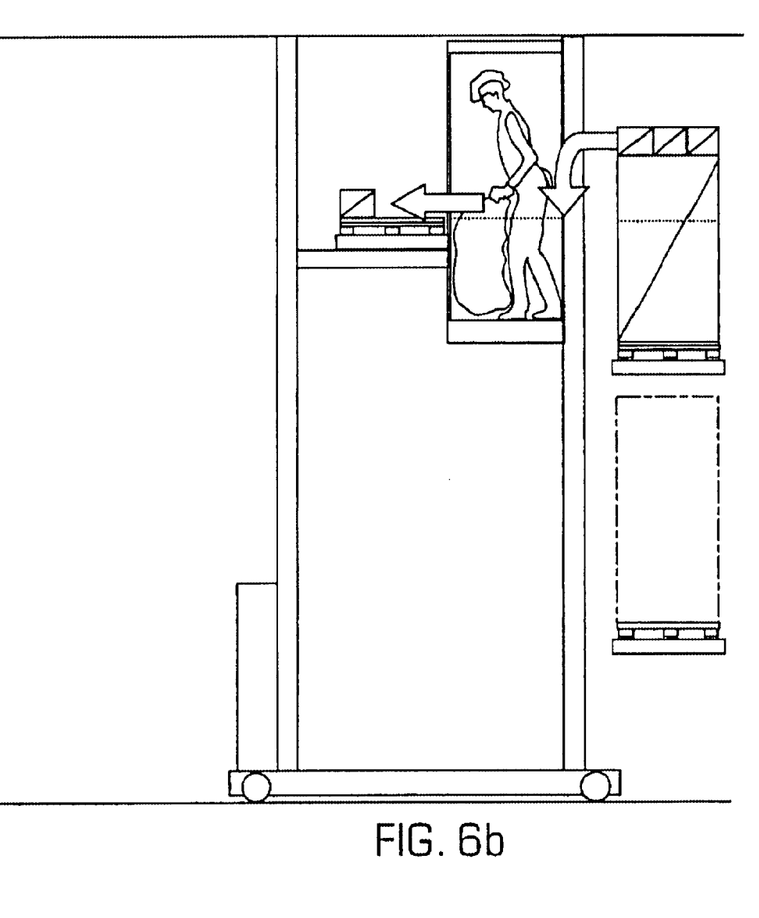
Figure 7A:
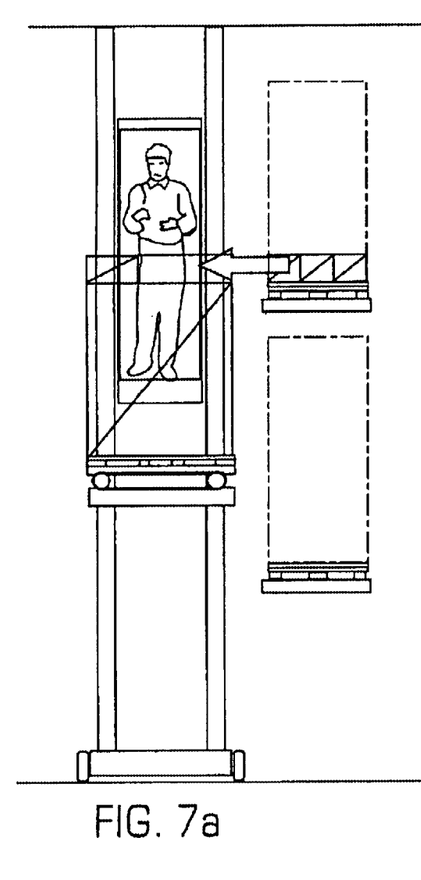
Figure 7B:
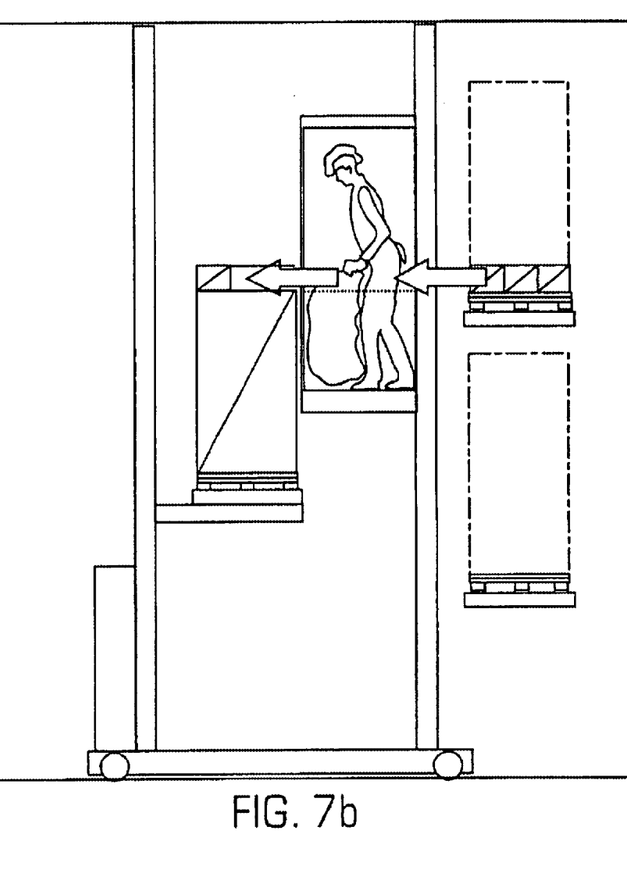
Figure 8A:
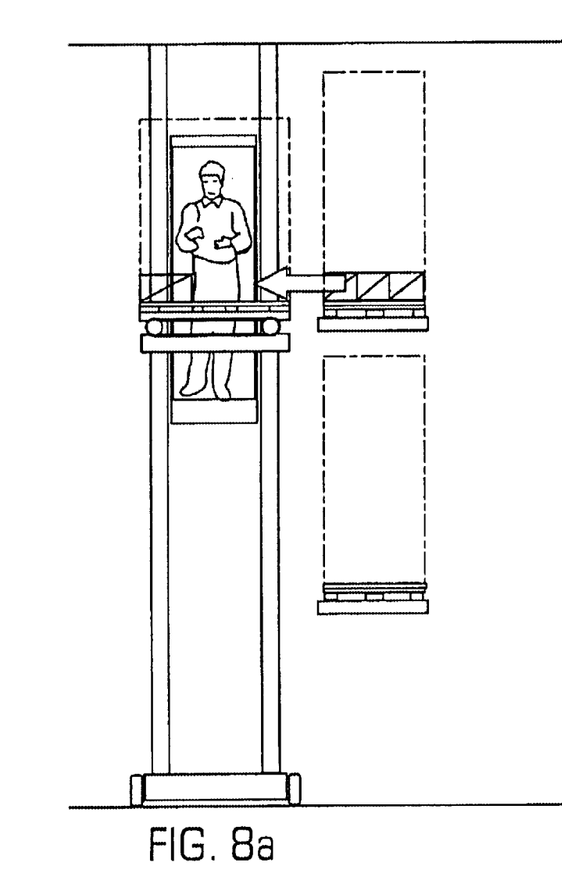
Figure 8B:
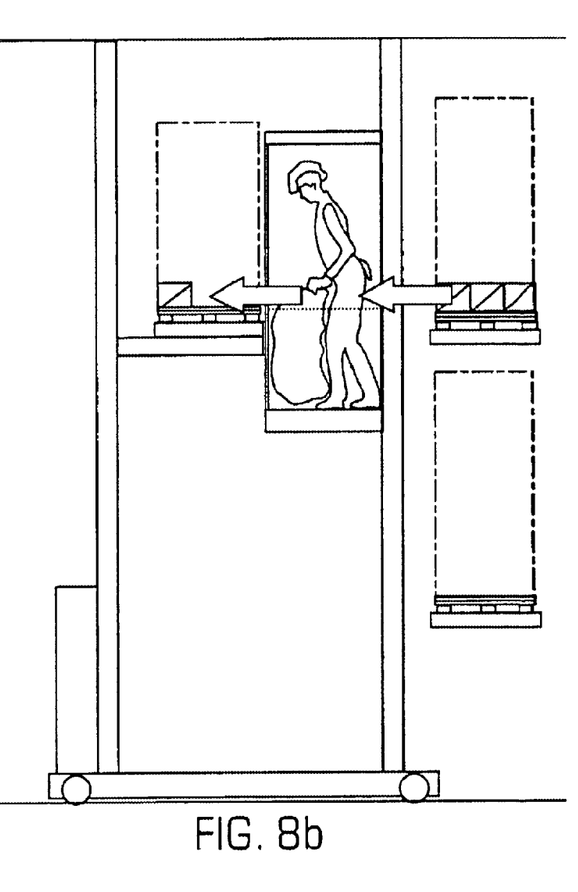
Figure 9A:
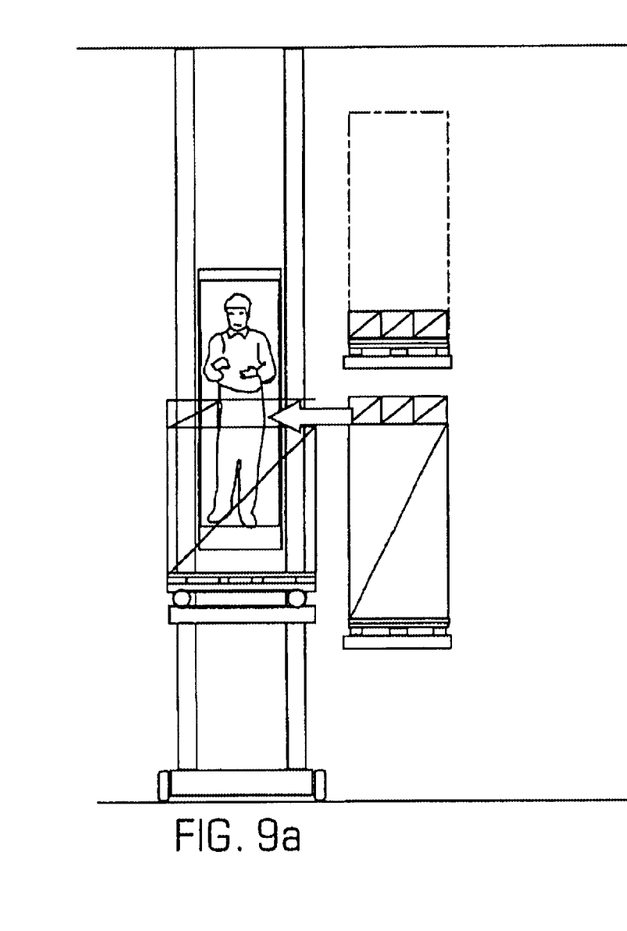
Figure 9B:
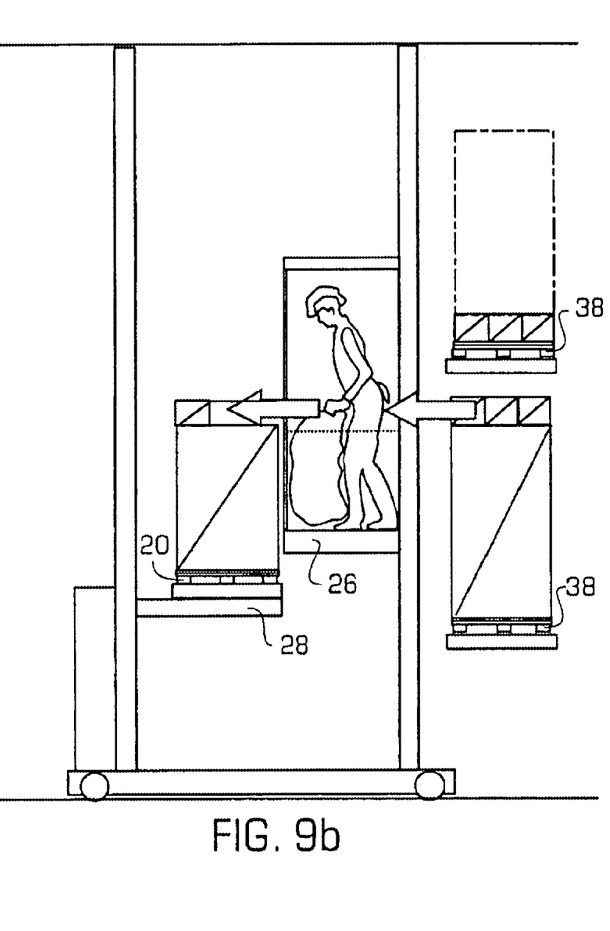
Figure 10A:
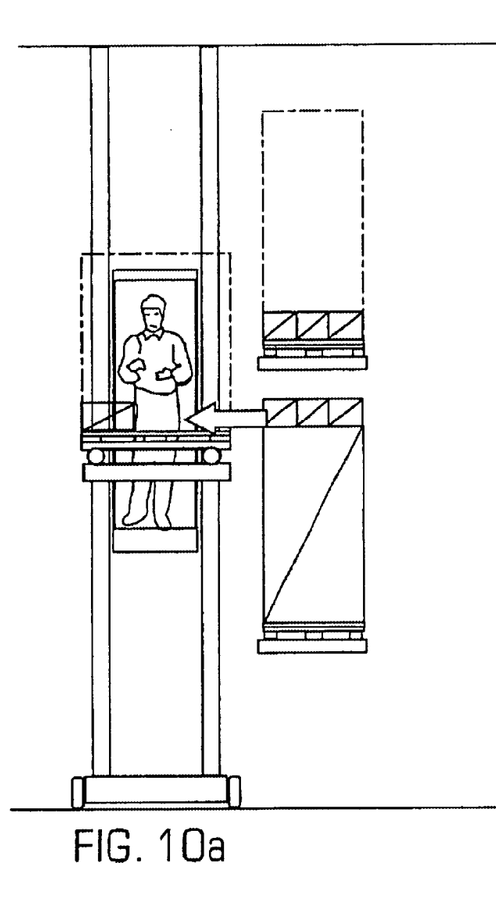
Figure 10B:
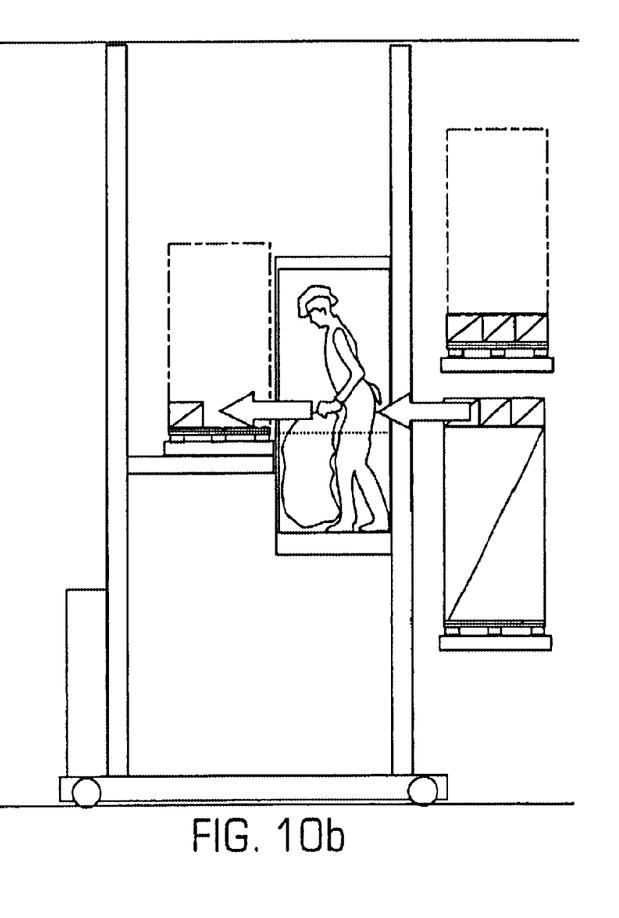
Figure 11A:
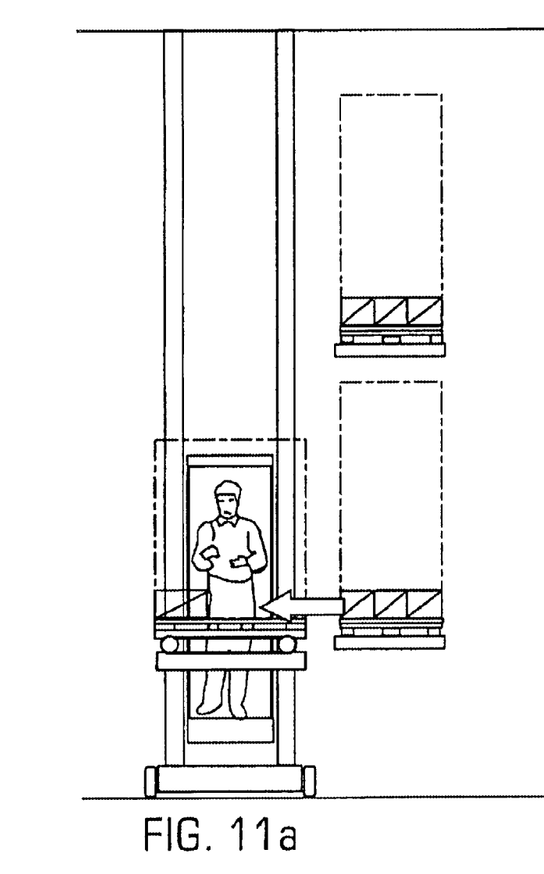
Figure 11B:
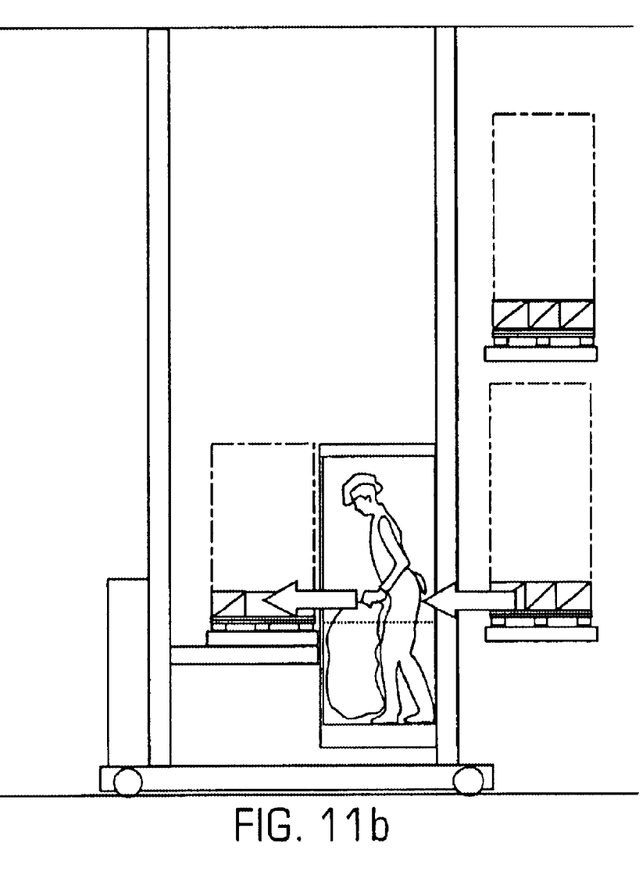
Figure 12A:
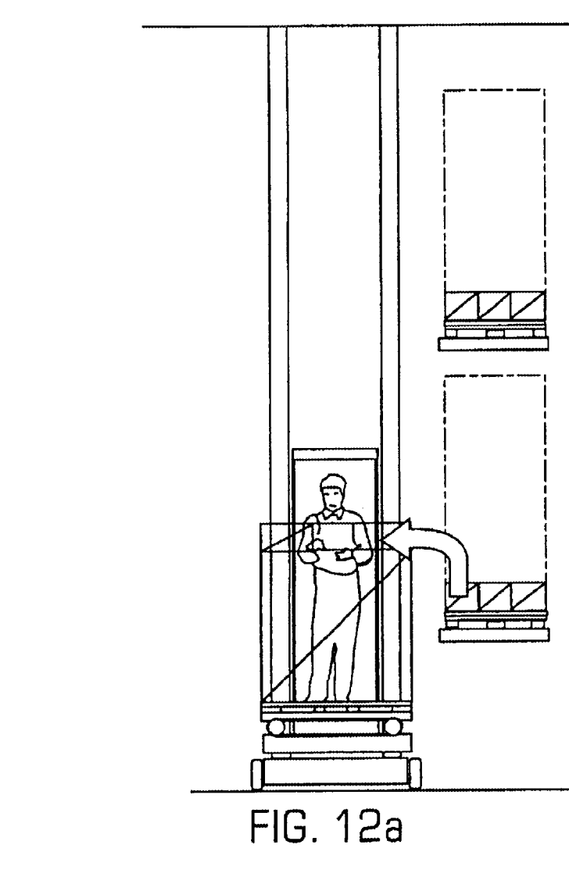
Figure 12B:
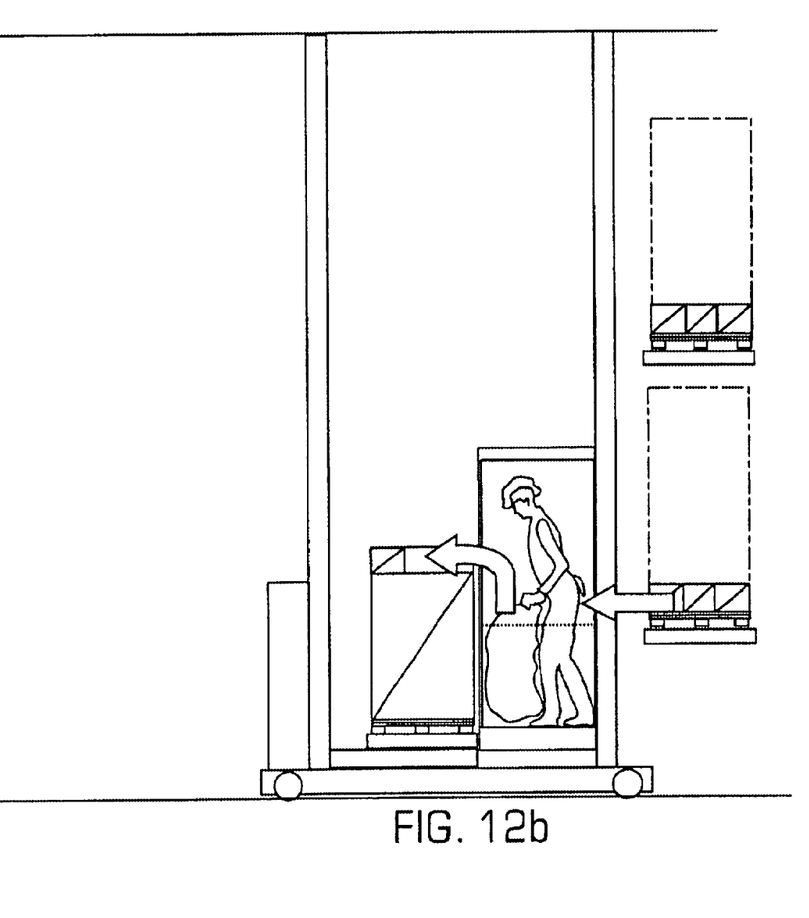

Reference is now made to FIGS. 3 and 4 in order to explain the integration of the EPM according to the invention into the system as a whole.

The installation according to FIGS. 3 and 4 is a system for the integrated storage and retrieval of pallets. In the case of the present embodiment, the pallets 50 are stored in two-storey pallet racks 52, in which the pallets are stored transversely and three deep. The articles are placed in readiness for picking in channels 54 on at least one plane, wherein each channel may hold three pallets one behind the other. As illustrated, two picking planes are disposed one above the other.

The placing of pallets into storage in the stock area and the feeding of pallets into the channels is effected by means of an automatic rack attendance unit 56. Stocking and picking are integrated in a single system, which guarantees short servicing times.

The provision of articles in the picking system may be effected in static and/or dynamic channels. Permanent pick-up locations in the picking system are allocated to articles with a high turnover (static line-up). In the static channels there are always up to three pallets of the respective article provided one behind the other. Picking is effected in front of the front pallet, the pallets behind are provided as stock. When the front pallet is empty, the pallet is removed by the picker by means of the EPM and the follow-up pallets automatically roll forward on the gravity roller conveyors 55 of the channels. The zero crossing acknowledgement of the picker triggers the provision of a new pallet from the stock area.

To reduce the picking front, articles with a low turnover may be lined up in the picking system dynamically, i.e. only when actually required. For said purpose, specific channels are defined, on which articles are lined up dynamically. When there is a request from the picking system for a dynamic article, the latter is lined up on the dynamic location and, in the event of a new article being requested, is removed and returned to the stock area.

All of the picking channels of the present installation may be equipped in such a way that they may be utilized both for static and dynamic provision.

In each case two rack rows 60, 62 form a module 58 having two picking fronts, along which the pickers pick articles for order pallets.

For picking, use is made of the ergonomic picking mobiles 10 according to the invention described in detail above, on which the workers at the picking front of a module pick the order items for an order and then pass on the order pallet. The EPMs channel the order pallets successively through the picking fronts where articles for the order pallet are lined up. When a plurality of EPMs are in use at a picking front, the pallet may be deposited on one of the buffer locations 64 and taken over by the next EPM. In order to switch between two opposing picking fronts, the pallet may likewise be deposited on buffer locations between the picking fronts and taken over by an EPM of the other picking front. Switching to the other side of a module is effected via buffer tracks 66 constructed in the racks 52 as well as via the respective rack attendance unit 56 of the associated module 58. Where a plurality of picking fronts are to be skipped, the pallet may be passed on to the next relevant module via the conveyor network 68. The buffer locations may also be set up as defined function locations e.g. for waste.

For picking the order items, a part-order pallet 20 is provided by the rack attendance unit 56 on a buffer track 66 in the pallet rack 52 for takeover by an EPM 10. At the start of an order, an empty pallet is fetched directly from an empty pallet dispenser 65 by the EPM 10. The pallet is received by the load-receiving means 34 of the EPM, which then travels automatically to the first retrieval position. The retrieval pallets 38 are already in place at the picking front. Positioning of the EPM in front of the retrieval pallet at the picking front is effected fully automatically by means of a control computer both in x direction and in y direction. For control of the actual picking, the terminal 36 is provided on the EPM and displays retrieval position and retrieval quantity. Once positioned in front of the respective channel 54, the picker may check the retrieval position and he then retrieves the displayed quantity and transfers the parts to the order pallet 20. For said process the platform 26 of the picker is adjusted in such a way as to provide an ergonomic removal height from the retrieval pallet for the picker. The order pallet is vertically adjusted in such a way that the retrieved parts may, as far as possible, be pushed over onto the order pallet without having to be lifted or lowered by the picker. After the transfer, the picker acknowledges the retrieval position. The EPM automatically positions itself in front of the next retrieval pallet or transfers the order pallet to a buffer location 64 (part-order pallet) or to a buffer location 62 (part-order pallet or completely picked pallet). Within the system the buffer locations allow a temporary "overtaking" of the pallets, with the result that optimized order completion times are achieved. At each picking front there is one picker operating on one EPM, although two EPMs may also be employed at a picking front. In the case of two EPMs at a picking front, the operating areas of the individual EPMs may overlap. The controller for the order pallet takes into account an optimization of the route of the picker and therefore enables a maximum picking capacity. On completion of picking in the operating area of the respective EPM, the order pallet is deposited on a buffer location in order to be passed on to other areas. It is theoretically also possible for a plurality of EPMs to be employed one above the other. This may be advantageous, given certain marginal conditions of article quantity and picking capacity, in that the base is minimized.

After the last pick the order pallet 20 is transferred via a buffer track 62 to a rack attendance unit 56 and deposited by the latter onto a suitable conveyor and transported to a despatch area, where sorting of the order pallets into orders and optionally consignments is effected.

The EPMs may travel with a fully extended lift without difficulty and a combined lifting/travelling motion may be realized with the EPM. Thus, the vertical positioning is effected substantially during the actual travelling time and therefore does not take up extra time. The fact that the order pallet constantly accompanies the picker eliminates journey times from the retrieval pallet to the order pallet. The total power transmission to the EPM is effected by contact line, which compared to conventional picking appliances leads to a saving of the traction battery. The transfer of data is effected via data light barriers. Control and power transmission of the buffer locations is effected from the vehicle by means of an "interrupted" contact line.

As is apparent from the above, the apparatus according to the invention in particular offers the following advantages:

- automatic travel to the picking position
- automatic positioning in front of the respective channel
- optimum ergonomic retrieval height at each retrieval pallet
- optimum ergonomic delivery height at each order pallet
- independent lifting of picker cabin to order pallet
- no waiting times for the picker
- no walking trips during picking
- order pallet accompanies picker, hence no journey times to the order pallet
- pallets brought up and delivered by conveyor
- heavy parts are pushed from the retrieval pallet onto the roller table and from there onto the order pallet without having to be lifted by the picker; no strain is put on the spinal column by the picking process
- high picking capacity as a result of mechanical transporting of the picker and order pallet on the EPM and an ergonomic, paper-free picking sequence
- particularly suitable for heavy and bulky articles as well as large-quantity picks
- variable use of one or two EPMs in an aisle
- the operating areas of two EPMs may overlap
- simultaneous start of order pallets at various EPMs.

| List of reference characters | |
|---|---|
| 10 | vehicle |
| 12 | chassis |
| 14 | first lifting device |
| 16 | second lifting device |
| 18 | picker |
| 20 | order pallet |
| 22 | frame |
| 24 | frame |
| 26 | platform |
| 28 | platform |
| 30 | cabin with crash guard |
| 32 | dead man's switch |
| 34 | load-receiving means |
| 36 | terminal |
| 38 | retrieval pallet |

| -continued | |
|---|---|
| List of reference characters | |
| 50 | pallets |
| 52 | pallet racks |
| 54 | channels |
| 55 | gravity roller conveyors |
| 56 | rack attendance unit |
| 58 | modules |
| 60 | rack row |
| 62 | rack row |
| 64 | buffer locations |
| 65 | empty pallet dispenser |
| 66 | buffer tracks |
| 68 | conveyor network |

What is claimed is:

1. An apparatus for picking articles situated on retrieval pallets in a pallet rack, the apparatus comprising a vehicle capable of traveling along the picking front of the pallet rack and having a first lifting device with a height-adjustable picker carrying device for the picker and having a second lifting device with a height-adjustable pallet-carrying device for an order pallet, wherein the picker-carrying device and the pallet carrying device are positionable heightwise relative to the respective retrieval position independently of one another, wherein the travel of the vehicle and of the lifting devices to the respective retrieval positions and/or transfer positions is controllable by means of a control computer, wherein the height of the picker-carrying device at the respective retrieval position is controllable on the basis of the residual stock quantity of the articles on the retrieval pallet, and wherein the height of the pallet-carrying device at the respective retrieval position is controllable on the basis of the degree of charging of the order pallet to a height allowing substantially horizontal transfer of articles from the retrieval pallet to the order pallet.

2. The apparatus according to claim 1, wherein the vehicle further comprises a base on which, viewed in a traveling direction A, at its one end the first lifting device and at its other end the second lifting device is disposed.

3. The apparatus according to claim 1, wherein the vehicle further comprises a base on which, viewed in traveling direction A, at its one end the first lifting device and at its other end the second lifting device is disposed.

4. The apparatus according to claim 1, wherein the picker-carrying device and the pallet carrying device are, in plan view, disposed opposite one another.

5. The apparatus according to claim 1, wherein the vehicle is rail-mounted.

6. The apparatus according to claim 1, wherein the picker-carrying device further comprises a circumferential crash guard for the picker.

7. The apparatus according to claim 1, wherein, above the order pallet, the pallet-carrying device comprises a terminal for displaying the picking positions.

8. The apparatus according to claim 1, wherein the picker-carrying device further comprises a dead man's switch.

9. The apparatus according to claim 8, wherein the dead man's switch is additionally designed for acknowledging the pick.

10. The apparatus according to claim 1, wherein the pallet-carrying device comprises a load receiving means for receiving and delivering the order pallet.

11. The apparatus according to claim 10, wherein the load receiving means is designed so as to enable transporting of the order pallet at right angles to the traveling direction (A) of the vehicle.

12. The apparatus according to claim 1, wherein the pallet-carrying device comprises a sensor device for determining the degree of charging of the order pallet.

13. The apparatus according to claim 1, wherein the travel of the vehicle and of the lifting devices to the respective retrieval positions and/or transfer positions is controllable by means of a control computer.

14. The apparatus according to claim 1, wherein the heights preset by the controller are manually correctable by the picker.

15. The apparatus according to claim 1, wherein the traveling movement of the vehicle and the lifting movements of the lifting devices are optionally effected simultaneously.

16. The apparatus according to claim 1, wherein the picker-carrying device comprises a standing seat for the picker.

17. The apparatus according to claim 1, wherein the power transmission to the vehicle is effected via a contact line.

* * * * *